United States Patent [19]
Segerström

[11] Patent Number: 5,806,180
[45] Date of Patent: Sep. 15, 1998

[54] METHOD AND DEVICE FOR AUTOMATIC COMPLETION OF CASING JOINT AT HIGH LINE VOLTAGE

[75] Inventor: Bo Torbjörn Segerström, Malmköping, Sweden

[73] Assignee: Vattenfall, AB, Stockholm, Sweden

[21] Appl. No.: 600,919

[22] PCT Filed: Aug. 26, 1994

[86] PCT No.: PCT/SE94/00783

§ 371 Date: Apr. 29, 1996

§ 102(e) Date: Apr. 29, 1996

[87] PCT Pub. No.: WO95/06346

PCT Pub. Date: Mar. 2, 1995

[30] Foreign Application Priority Data

Aug. 27, 1993 [SE] Sweden .................................. 9302762

[51] Int. Cl.[6] .............................. H01R 43/00; F16B 2/02
[52] U.S. Cl. ................... 29/745; 29/866; 29/868; 29/872; 403/314; 403/367; 403/368
[58] Field of Search .................... 29/825, 868, 869, 29/745; 403/314, 367, 368, 374

[56] References Cited

U.S. PATENT DOCUMENTS

| | | | |
|---|---|---|---|
| 3,436,820 | 4/1969 | Reem et al. | 29/872 |
| 3,828,601 | 8/1974 | Tessmann . | |
| 3,890,689 | 6/1975 | Copas | 29/745 |
| 3,934,784 | 1/1976 | Tessman | 29/871 X |
| 3,956,822 | 5/1976 | Folk | 29/868 |
| 4,223,436 | 9/1980 | Silva | 29/869 |
| 4,512,828 | 4/1985 | Helm | 29/868 X |
| 4,531,283 | 7/1985 | Kitchens et al. | 29/872 X |

*Primary Examiner*—Carl J. Arbes
*Attorney, Agent, or Firm*—Robert Platt Bell & Associates, P.C.

[57] ABSTRACT

The apparatus of the present invention comprises two parts; an apparatus for automatically installing the supplemental (shunt) joint, and the shunt joint itself. The shunt joint provides both mechanical and electrical connection between two ends of an electrical cable, augmenting the existing joint which may remain in place. The installation device comprises a frame which may be lifted into place over the power line by a crane or helicopter. The frame is provided with a first linear actuator for placing at least first and second wedge elements fitted at each end of an existing socket joint. The frame also comprises a second linear actuator for placing first and second wedge sockets at least partly surrounding the line and cooperating with corresponding wedge elements. At least one threaded shaft, powered by an actuator motor, is provided to pull together the wedge sockets with the wedge elements. Together, the wedge elements and wedge sockets surround and lock around the line at each side of the socket joint. Once locked around the line, the coupling between the actuator motor and the threaded shaft may be severed, and the frame and associated elements removed from the line. The wedge elements and wedge sockets, clamped around the line, remain. The wedge sockets are firmly tied together across the existing joint by the one or more threaded shafts, forming a mechanical as well as electrical shunt joint in parallel to the existing joint.

17 Claims, 12 Drawing Sheets

METHOD AND DEVICE FOR AUTOMATIC COMPLETION OF CASING JOINT AT HIGH LINE VOLTAGE

FIELD OF THE INVENTION

The present invention relates to a method and a device for automatic installing a supplement to a socket joint in a high voltage electrical line with the supplement comprising an additional joint in the form of a shunt.

BACKGROUND OF THE INVENTION

High voltage power lines are provided with joints at various locations for manufacturing and transportation reasons. When manufactured, electrical lines may be wound onto reels of predetermined lengths. Such reels may be readily transported to a location for installation. As such, it may be necessary to install a joint at a point where successive reels are to be spliced together. In addition, such joints may be required where aline is repaired after a break or the like.

Electrical cables with a core of steel, surrounded by aluminum threads have a normal length of 1000–3000 meters. As an example, the Swedish high voltage power distribution system extends approximately 15,000 kilometers, with each power line comprising approximately six to nine cables. Thus, a typical power distribution system may contain an appreciable number of joints.

FIG. 1 illustrates a typical prior art joint for a high voltage power line. Joints in high voltage power lines in most instances comprise an aluminum socket 2, in which the ends of a cable 1 to be joined have been introduced. The socket is then pressed together under a high hydraulic pressure at points 3 and 4 to crimp the cables into place and form an electrical and mechanical connection.

As an example, the major part of the Swedish power supply system was built between 1940 and 1960. The great number of such joints have thus been exposed, during the last 30 to 40 years, to alternating rain, cold and heat and to a corrosive environment. Such exposure has in many cases led to corrosion damage to such socket joints. Corrosion damage in socket joints may weaken the joint, and the joint may not safely withstand the mechanical load they are designed for. Moreover, such corrosion may introduce electrical resistance into the joint, causing increased heating at the joint and reduced load carrying capacity for the entire power line.

Disasters have occurred when cables transferring current for 400 kV lines have fallen down because of joint failure. Such accidents cause great risks and expensive service interruption for repair of the joint concerned, which has hitherto been performed with more or less manual methods at ground level.

Thus, it is desirable to reinforce such joints prior to failure rather than wait until a failure occurs and disaster strikes. However, due to electrical demand, it may be difficult to justify disruption of electrical service to replace or reinforce a joint which may or may not be on the verge of failure. Thus, it remains a requirement in the are to be able to reinforce a high voltage electrical joint in situ, without disruption of electrical power during the joint repair.

SUMMARY AND OBJECTS OF THE INVENTION

It is an object of the present invention to provide a method and apparatus for installing a supplemental joint in a high voltage line which may be used while the line is in service.

It is a further object of the present invention to provide an apparatus for installing a supplemental joint in a high voltage line which is relatively simple to use.

It is a further object of the present invention to provide an apparatus for installing a supplemental joint in a high voltage line which has a simple design.

It is a further object of the present invention to provide a method and apparatus for installing a supplemental joint in a high voltage line, such that the cost for installing the supplemental joint is low compared with methods for replacing joints used hitherto.

The apparatus of the present invention comprises two parts; an apparatus for automatically installing the supplemental (shunt) joint, and the shunt joint itself. The shunt joint provides both mechanical and electrical connection between two ends of an electrical cable, augmenting the existing joint which may remain in place.

According to the present invention, such an installation device is characterized in that it comprises a frame which may be lifted into place over the power line by a lifting device such as a crane or helicopter. At least one driving wheel is provided on the frame to engage the electrical line and move the frame into position longitudinally. A motor is provided for driving the driving wheel.

The frame is provided with first device for placing at least first and second wedge elements fitted at each end of an existing socket joint. The frame also comprises a second device for placing first and second wedge sockets at least partly surrounding the line and cooperating with corresponding wedge elements. At least one threaded shaft, powered by an actuator motor, is provided to pull together the wedge sockets with the wedge elements. Together, the wedge elements and wedge sockets surround and lock around the line at each side of the socket joint.

Once locked around the line, the coupling between the actuator motor and the threaded shaft may be severed, and the frame and associated elements removed from the line. The wedge elements and wedge sockets, clamped around the line, remain. The wedge sockets are firmly tied together across the existing joint by the one or more threaded shafts, forming a mechanical as well as electrical shunt joint in parallel to the existing joint.

The device also comprises a communication device for remote control of the actuator motor, the motor, and the first and second devices.

Of course, many embodiments are possible within the scope of the present invention. Suitably, the frame is provided with guide rails for guiding the device to fit the driving wheel on a line. Thereby it is insured that the device is placed in a correct position on the line and does become located perpendicularly to the line, causing obstruction and delay.

In one advantageous embodiment of the device according to the present invention, the actuator motor is provided in a slidable fashion along a guide rail which is fixed to the frame, and a bucker is provided displaced horizontally along the guide rail from the actuator motor, also in a slidable engagement. With this arrangement, handling of the device upon the line is facilitated. A remotely controlled locking device, preferably with at least a partly electrical function may be provided to lock, at a control impulse, the actuator motor and the bucker at chosen mutual positions along the guide rail.

To insure safety when handling the device according to the present invention, a first and second position devices may be provided, each connected to a respective lifting point, arranged to be lifted by the lifting device, preferably each via its own line. The first position device, when pulled at its lifting point, pulls the actuator motor in the direction away from the bucker. The second position device, when pulled at its lifting point, pulls the bucker in a direction away from the actuator motor.

With this arrangement, which will be described more in detail below, it may be insured that the device may be safely placed upon the line, and may be pulled therefrom safely.

The wedge elements and the wedge sockets, cooperating with them, may of course be formed in many ways. In the preferred embodiment, it is suitable to utilize two pairs of each two wedge elements, cooperating with two pairs of corresponding wedge sockets. The wedge elements may, like the wedge sockets in each pair, be formed so that they may be joined, journalled around a hinge parallel to their longitudinal direction. Concerning the wedge elements, this hinge is connected to the threaded shaft or preferably two threaded shafts, which should be arranged symmetrically at each side of the line.

BRIEF DESCRIPTIONS OF THE DRAWINGS

The present invention shall be described more in detail in the following detailed description, reference being made to the enclosed schematic figures.

DETAILED DESCRIPTION OF THE INVENTION

Figure 1:
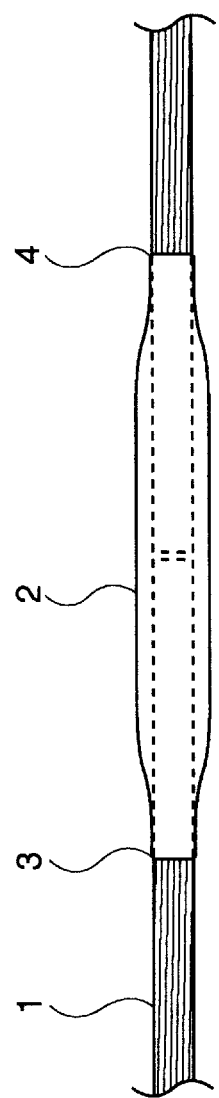
FIG. 1 is a side view of a traditional joint in a high voltage electrical line.
Figure 2:
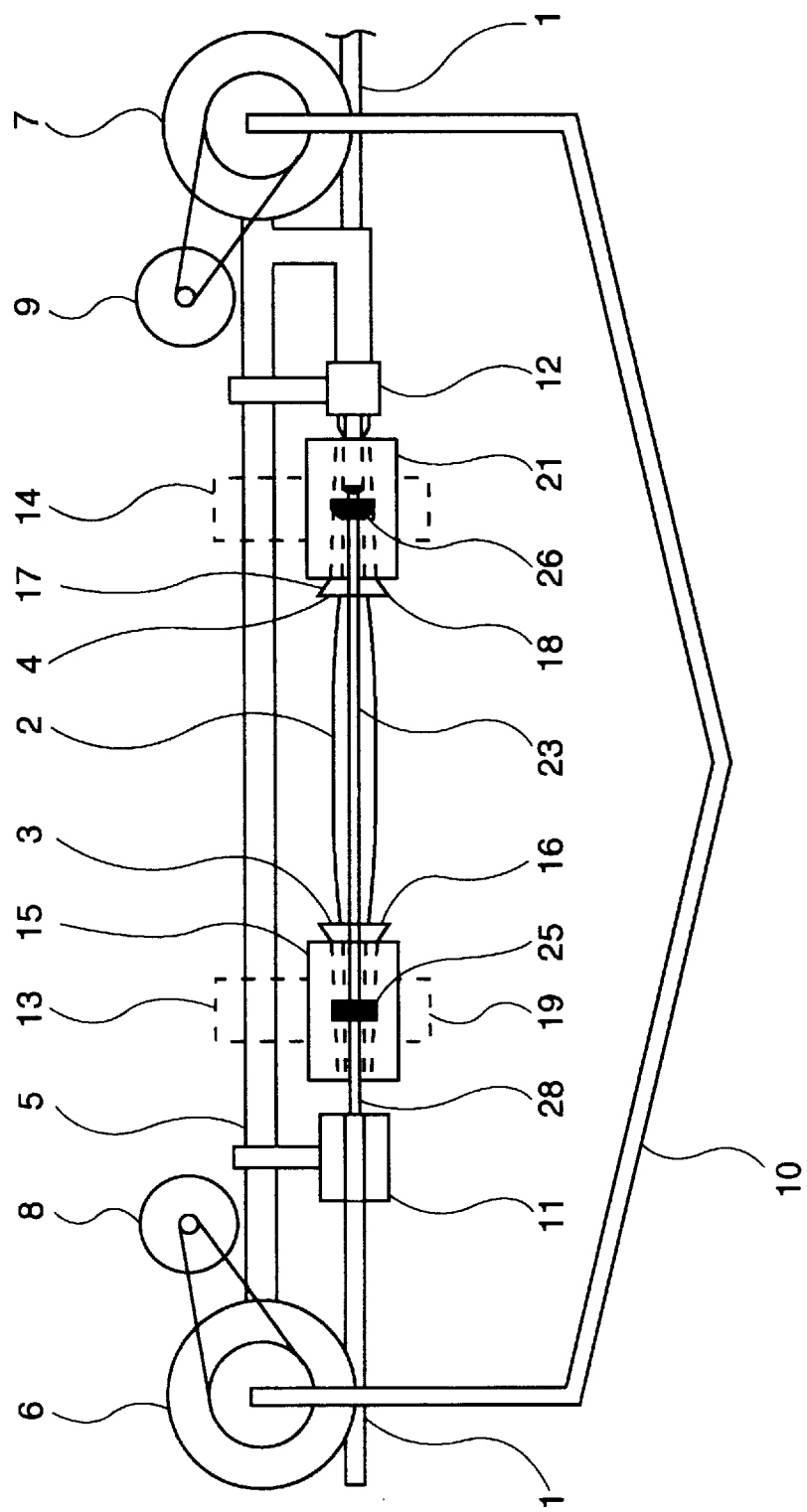
FIG. 2 is a side view of an embodiment of the device according to the present invention, with certain details omitted for clarity.

FIG. 2 is a side view of an embodiment of the device according to the present invention shown mounted on high voltage power line 1. Frame 5 includes two driving wheels 6 and 7 for engaging cable 1. Each of driving wheels 6 and 7 may be provided with motors 8 and 9 for turning driving wheels 6 and 7 to move frame 5 along cable 1 into a position straddling a joint.

Frame 5 is provided with two downwardly diverging guide rails 10, one on each side of cable 1, of which only one is seen in FIG. 2. Guide rails 10 aid in positioning the apparatus on electrical line 1 when the apparatus is being lowered into position via crane, helicopter, or the like.

An actuator motor 11 and bucker 12 are provided in a horizontal arrangement along a portion of frame 5 which forms a guide rail. As its name implies, bucker 12 acts as a backstop or support against wedge sockets 21 and 22, the latter of which is not shown for purposes of clarity.

First and second guides 13 and 14 are indicated, but are not shown in detail in FIG. 2. First and second guides 13 and 14 function to position two pairs of wedge elements 15,16 and 17,18 respectively, on to two pairs of wedge sockets 19,20 and 21,22 respectively, which in turn will clamp two portions of line 1. Of the latter, only wedge sockets 19 and 21 are illustrated in FIG. 2 for the purposes of clarity.

Two threaded shafts 23,24 are provided, with threaded shaft 23 (shown) on the outside of wedge sockets 19 and 21, and threaded shaft 24 (not shown) on the outside of wedge sockets 20 and 22. Threaded shaft 23 cooperates with nut elements 25 and 26 to pull together the wedge sockets 19 and 21 by rotation of threaded shaft 23, by actuator motor 11. Threaded shaft 24 cooperates with respective nut elements (not shown) mounted on wedge sockets 20 and 22 to pull together wedge sockets 20 and 22 by rotation of threaded shaft 24, by a second actuator motor (not shown).

Note that FIG. 2 is a side view of the installation apparatus and shunt joint installed on high voltage power line 1. Threaded shaft 23 runs alongside high voltage power line 1, and thus appears from the side view to be in front of high voltage power line 1 and existing joint 2.

In the preferred embodiment, two threaded shafts 23 and 24 are used to simultaneously draw both pairs of wedge sockets 19,20 and 21,22 together. However, it is entirely within the spirit and scope of the present invention to provide a single threaded shaft 23 to draw both pairs of wedge sockets 19,20 and 21,22 together.

Actuator motor 11 is shown transferring torque to threaded shaft 23 via a shaft 28 having a turned cavity. The latter has such predetermined dimensions that it will shear when a certain predetermined torque value is achieved. Such a torque value may be achieved when wedge sockets 19,20 and 21,22 have pulled the respective pairs of wedge elements 15,16, and 17,18 around electrical line 1 framed by ends 3 and 4 of joint 2. Once shaft 28 shears, frame 5 may be lifted off the high voltage power line 1, leaving the shunt joint in place.

Figure 4:
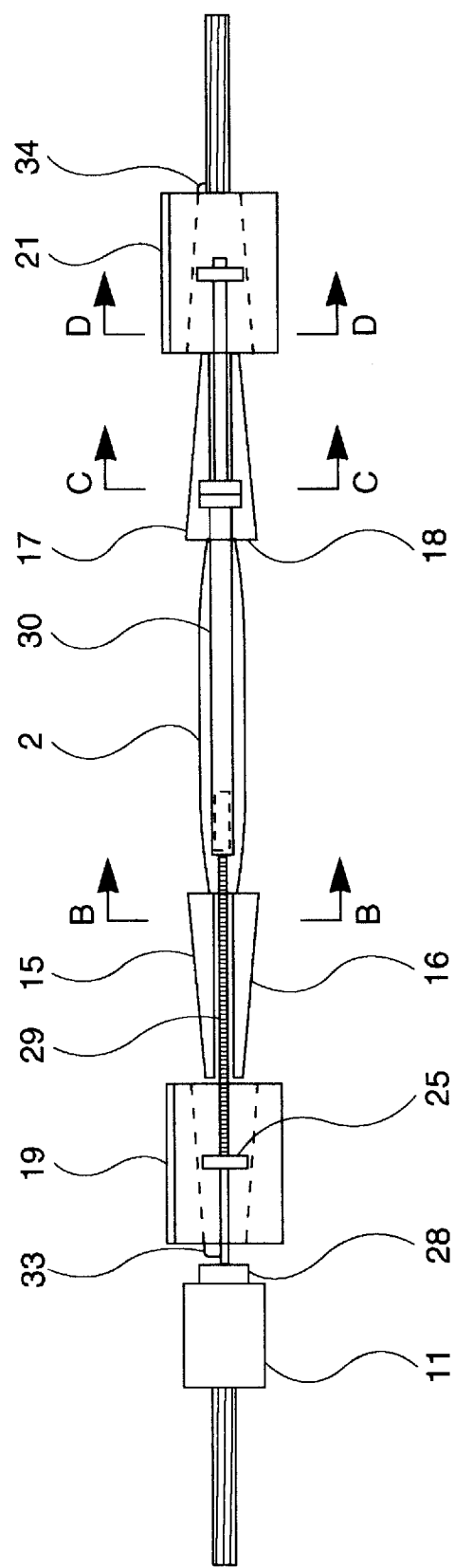
FIG. 4 is a side view illustrating details of the device according to the present invention.

FIG. 4 illustrates details of a second embodiment of the device according to the present invention. In FIG. 4, only the shunt joint elements and actuator motor 11 are illustrated for purposes of clarity. The diagram of FIG. 4 gives the reader a better idea of what the shunt joint will look like on power line 1 once installed.

In the embodiment of FIG. 4, threaded shaft 23 and nut elements 25 and 26 are replaced with threaded shaft 29, an internally threaded pipe socket 30, and nut element 25. A second threaded shaft, nut element, and threaded pipe socket may be provided on the other side of joint 2 so that tension is evenly applied across joint 2.

Shaft 29 cooperates with nut device 25 on wedge socket 19 and pipe socket 30, which is attached to wedge socket 21. Actuator motor 11 drives threaded shaft 29 through shaft 28. Threaded shaft 29 threads into pipe socket 30, drawing wedge socket 19 and wedge socket 21 together.

Figure 5:
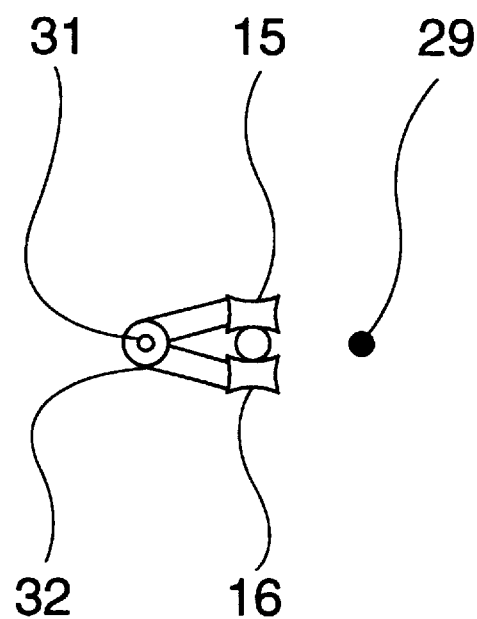
FIG. 5 is a cross section according to the marks B—B in FIG. 4.
Figure 6:
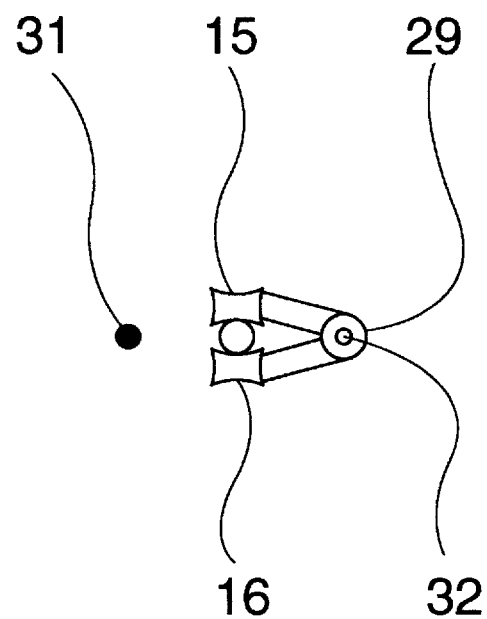
FIG. 6 is a cross section according to the marks C—C in FIG. 4.

As illustrated in FIGS. 5 and 6, the form of wedge elements 15,16 and their hinge 32 is illustrated in their longitudinal direction, around which they are journalled. Note the relationship between threaded shaft 29 and wedge elements 15 and 16, which lie adjacent to threaded shaft 29.

Figure 7:
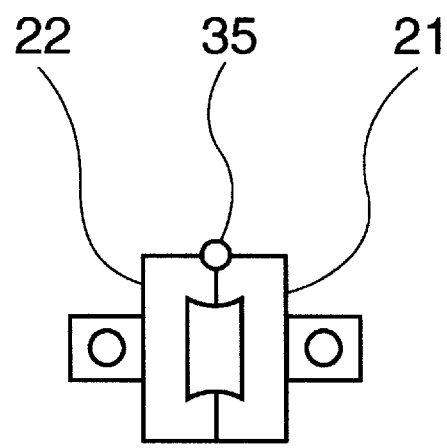
FIG. 7 is a cross section according to the marks D—D in FIG. 4.
Figure 8:
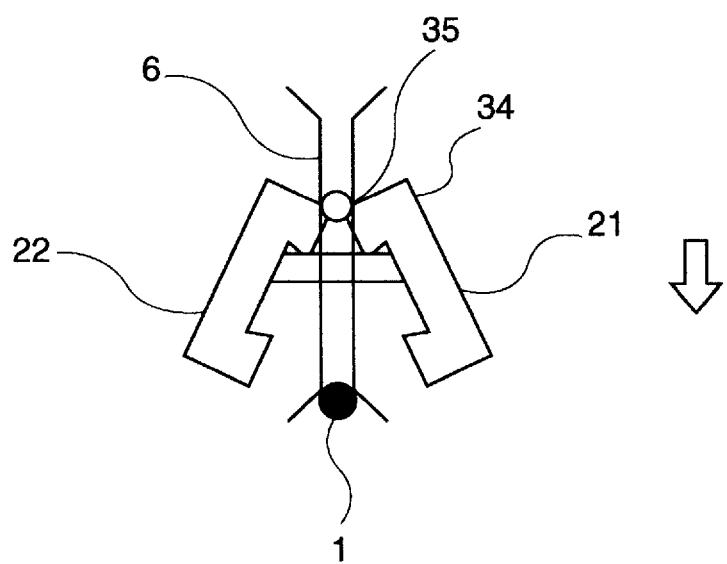
FIG. 8 is a cross section through a pair of hinged wedge sockets which are opened.
Figure 9:
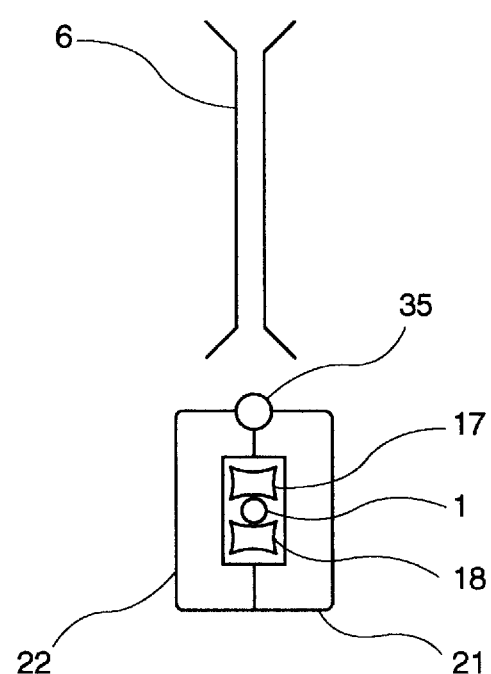
FIG. 9 is a cross sectional through the wedge sockets.

Wedge sockets 21 and 22 are shown in cross section in FIG. 7 and more in detail in FIGS. 8 and 9. These wedge sockets are joined by a hinge 35 in their longitudinal direction, around which they are mutually journalled. FIG. 8 illustrates the wedge sockets in an open position, while FIG. 9 illustrates the same surrounding electrical line 1 with wedge elements 17,18 inserted. Note how when wedge elements 17 and 18 are inserted into wedge sockets 21 and 22 then serve to lock then entire assembly in a closed position when the tapered inner portions of wedge sockets 21 and 22 engage corresponding portions of the wedge elements 17 and 18.

A distance element 34 may be used to localize wedge sockets 21 and 22 at the correct height above high voltage power line 1, such that wedge elements 17,18 may be surrounded by wedge sockets 21 and 22. In FIG. 4 a corresponding distance element 33 is shown for wedge sockets 19 and 20.

Figure 10:
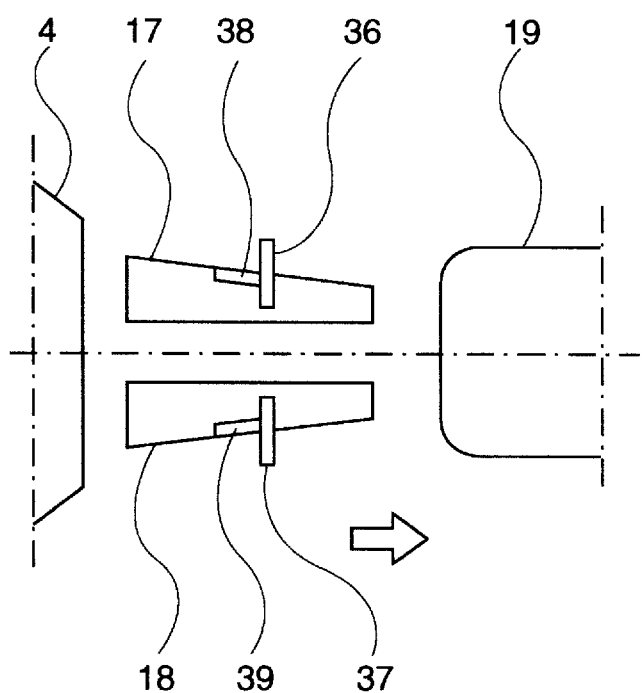
FIG. 10 is a side view of a pair of wedge elements in a first position at the introduction of the wedge elements into the corresponding wedge sockets.
Figure 11:
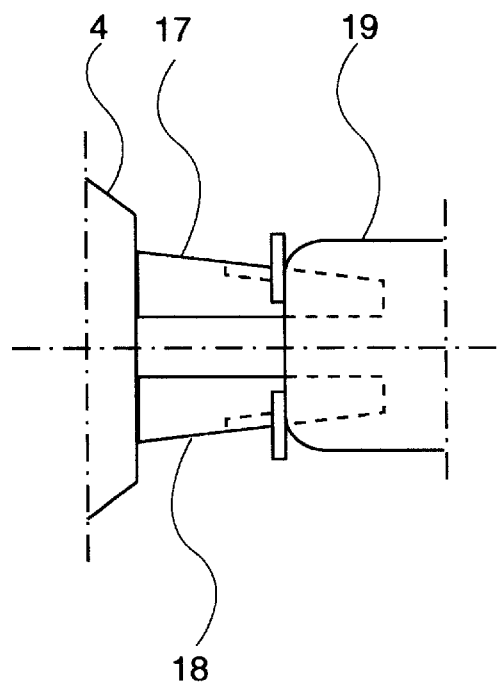
FIG. 11 is a side view of a pair of wedge elements in a second position at the introduction of the wedge elements into the corresponding wedge sockets.
Figure 12:
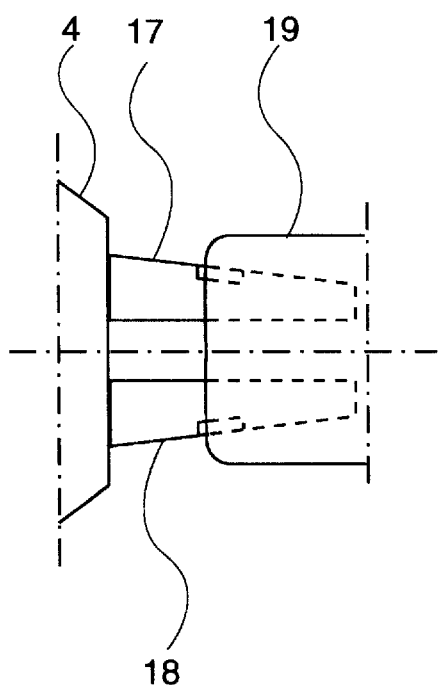
FIG. 12 is a side view of a pair of wedge elements in a third position at the introduction of the wedge elements into the corresponding wedge sockets.

In the FIGS. 10–12, wedge elements 17,18 are shown, provided with guide pins 36,37, able to be countersunk into recesses 38,39. High voltage power line 1 has been omitted from FIGS. 10–12 for purposes of clarity, but is understood to be present between the wedge elements. When wedge sockets 19 and 20 (not shown) are led towards wedge elements 17 and 18, guide pins 36 and 27 cause wedge elements 17 and 18 to be led towards end 4 of joint 2, to be countersunk into recesses 38 and 39, as illustrated in FIG. 12.

Figure 3:
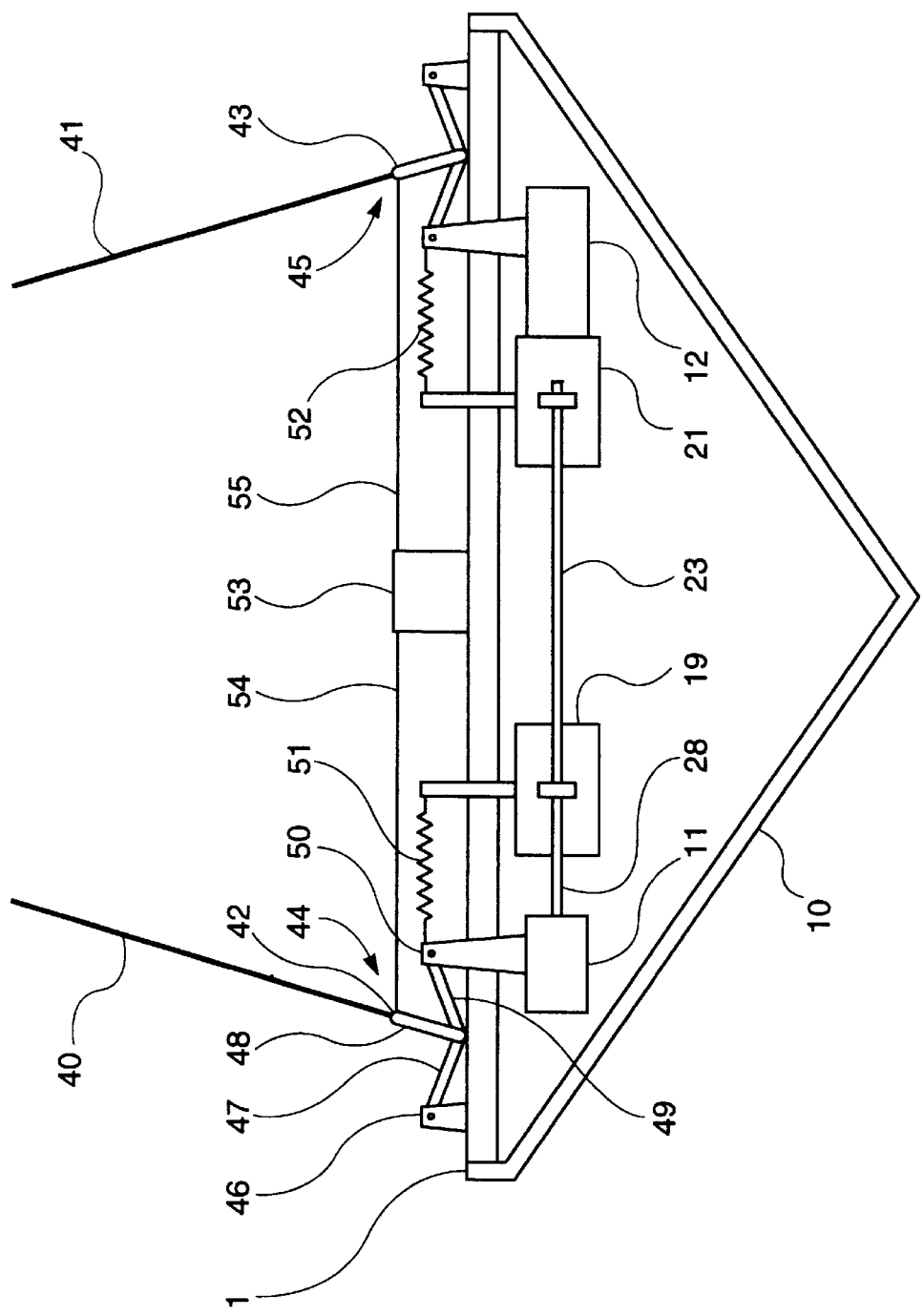
FIG. 3 is a side view of an alternative embodiment of a device according to the present invention, also with certain details omitted for clarity.

FIG. 3 illustrates an alternative embodiment of the device according to the present invention, where frame 5 is provided to be lifted by a lifting device (not shown) via two line elements 40 and 41. Line elements 40 and 41 are fastened, each in its own lifting point 42 and 43, respectively in first and second positioning devices 44 and 45.

The first positioning device 44 comprises hinge 46, fixed to frame 5, first link arm 47, plate 48, second link arm 49, and hinge 50, fixed to actuator motor 11. The other positioning device 25 is constructed in a similar manner as positioning device 44, however, the last hinge element is connected to bucker 12.

Positioning devices 44 and 45 are illustrated in a downward position. That is to say with first link arm 47 and second link arm in a down position. However, actuator motor 11 is in contact with threaded shaft 23 and bucker 12 is pressing against wedge socket 21. Spring elements 51 and 52 strive to keep the wedge sockets 19 and 21 at a desired mutual distance.

An electrically, remotely controlled locking element 53, comprising beam elements 54 and 55 lock positioning devices 44 and 45 in this position, allowing the apparatus to be lifted by lines 40 and 41 without any change in the mutual positions of actuator motor 11 and bucker 12.

Operation of the present invention will be described as follows in connection with FIG. 3. The device is first lifted into one starting position with joint 2 within the distance between wedge sockets 19,21 and wedge sockets 20,22 (not shown) placed on each side of the joint. The lifting device is lowered, so that lines 40 and 41 lose their slack, whereafter the locking device 53 is unlocked. Actuator motor 11 pulls the wedge sockets together via threaded shaft 23, and thus also wedge elements 15,16 and 17,18, until the torque limiter, comprising shaft 28 with the turned cavity is broken.

When lines 40 and 41 are lifted, positioning device 44,45 will pull actuator motor 11 and bucker 12 apart from one another such that the device may be lifted from the line, leaving the completed shunt joint in place. Since shaft 28 has been sheared by the torque of actuator motor 28, actuator motor 11 is no longer in physical contact with the joint. Bucker 12, as the name implies, provides a back support which pushes against wedge sockets 21,22 but is not physically coupled to them. Thus, the apparatus may be lifted off once shaft 28 is severed, leaving the shunt joint in place.

If a helicopter is used as a lifting device, it will fly in position with the device lifted by lines 40,41, and place the device in the vicinity of the defective joint 2. When the device is in a suitable position with relation to high voltage power line 1, the helicopter lowers a few meters so that the device will rest upon high voltage power line 1.

A suitably utilized optical fibre cable (not shown) may be used for communication between the helicopter and the device to control, for example, operation of actuator motor 11 or the like. The device may be given an impulse to be driven via driving wheels 6 and 7 to take a position over joint 2. A video camera (not shown) may be used to monitor the process and transmit the image back over the fiber optic cable to the helicopter. The device is then given an impulse to be sunk down until the distance elements give the wedge sockets the correct vertical position in relationship to the line.

Wedge sockets 19,20 and 21,22 are then closed around the line, as illustrated in FIGS. 8 and 9. Wedge sockets 19,20 and 21,22 may be moved into position by a linear actuator or the like. Wedge elements 15,16 and 17,18 are closed around high voltage power line 1 by another linear actuator. The completion of these movements is checked partly by electrical sensors (not shown) which report to the helicopter operator, and partly by optical control, performed by suitably positioned video cameras, (not shown) by the helicopter operator.

When the device has been mounted safely, actuator motor 11 is started as stated above, such that wedge sockets 19,20 and 20,21 and wedge elements 15,16 and 17,18 are pulled together to a firm bond against the ends 3,4 of joint 2 on high voltage power line 1 at each side of joint 2. Threaded shaft 23, (usually two threaded shafts 23,24) thus function as a shunt line.

When the completed joint is ready, the device is lifted away. Positioning devices 44 and 45, shown in FIG. 3, pull actuator motor 11 and bucker 12 apart, so that the device may be lifted away. Locking device 53 is positioned in the beginning of the operation cycle and may be in locked or unlocked position, as has been described above. Locking device 53 and positioning devices 44 and 45 make it possible that the device may be lifted from the line in any position, if this should be necessary.

While the preferred embodiment and various alternative embodiments of the present invention have been disclosed and described in detail herein, it may be apparent to those skilled in the art that various changes in form and detail may be made therein without departing from the spirit and scope thereof.

I claim:

1. An apparatus of for augmenting a socket joint in a line with an additional shunt joint, the shunt joint comprising at least first and second wedge elements placed at each end of the socket joint, first and second wedge sockets at least partly surrounding the line and cooperating with a corresponding wedge element, and at least one threaded shaft, threadably coupled to the first and second wedge sockets, for connecting the first and second wedge sockets and pulling the wedge sockets together, when rotated, to clamp the wedge elements and wedge sockets to the line, said apparatus comprising:

a support provided to be lifted onto the line, the support including:

first means for placing the at least first and second wedge elements at each end of the socket joint, second means for placing the first and second wedge socket means at least partly surrounding the line and cooperating with a corresponding wedge element, an actuator motor, coupled to the at least one threaded shaft, for rotating the threaded shaft to pull together the wedge socket elements so as to lock the wedge socket elements with the wedge elements around the line at each side of the socket joint.

2. The apparatus of claim 1 further comprising:

a pair of downwardly depending guide rails, coupled to the support, for guiding the support onto the line when the support is lowered onto the line from above.

3. The apparatus of claim 1, wherein the actuator motor is horizontally displacable along the support and the apparatus further comprises:

a bucker, provided horizontally displacable along the support, for providing longitudinal support to at least one wedge socket during installation of the shunt joint; and a remote controlled locking means, for locking the actuator motor and the bucker to the support during installation of the shunt joint.

4. The apparatus of claim 3 further comprising:

a torque limiter, coupled between the actuator motor and the at least one threaded shaft, for decoupling the actuator motor from the at least one threaded shaft at a predetermined torque threshold.

5. The apparatus of claim 4 further comprising:

first and second positioning means, each connected to a lifting point of the apparatus and arranged to be lifted by a lifting device each via a corresponding cable, the first positioning means being provided to pull, when its lifting point is pulled, the actuator motor in a direction away from the bucker, the second positioning means being provided to pull, when its lifting point is pulled, the bucker in a direction away from the motor means such that the apparatus may be removed from the line once the shunt joint has been installed.

6. The apparatus of claim 5 wherein said wedge elements comprise two pairs of each two wedge elements.

7. The apparatus of claim 6, wherein the wedge elements in each pair are formed to be joined, journalled around a hinge parallel to their longitudinal direction.

8. The apparatus of claim 7 wherein said hinge is connected to said at least one threaded shaft.

9. The apparatus of claim 8 wherein said first and second wedge socket means each comprise pairs of each two wedge socket elements.

10. The apparatus of claim 9, characterized in that the wedge socket elements in each pair are formed to be joined, journalled around a hinge parallel to their longitudinal direction.

11. The apparatus of claim 10 characterized in that said at least one threaded shaft comprises two threaded shafts, each of said two threaded shafts engaging a corresponding one of the pair of wedge socket elements.

12. An apparatus for augmenting a socket joint in a high voltage power line with an additional shunt joint, said apparatus comprising:

a first frame including at least one driving wheel for engaging the high voltage power line and for supporting the frame while installing the shunt joint and a remotely controlled driving means for driving said at least one driving wheel to position the frame over the socket joint;

a first means, coupled to the support and remotely controlled for locating at least first and second wedge elements at each end of the socket joint;

second means, coupled to the support and remotely controlled for locating first and second wedge sockets at least partly surrounding the high voltage power line, on either side of the joint, and cooperating with a corresponding pair of wedge elements;

at least one threaded shaft, coupled to the first and second wedge sockets turned by remote control of a motor, for pulling the wedge socket elements towards one another so as to surround and engage the wedge elements and lock the wedge elements around the high voltage power line at each side of the socket joint, wherein the wedge sockets, the wedge elements and the at least one threaded shaft form a shunt joint for mechanically and electrically coupling the high voltage power line.

13. The apparatus of claim 12 further comprising:

a pair of downwardly depending guide rails, coupled to the frame, for guiding the frame onto the high voltage power line when the frame is lowered onto the high voltage power line from above.

14. The apparatus of claim 12, wherein the actuator motor is horizontally displacable along the frame and the apparatus further comprises:

a bucker, provided horizontally displaceable along the frame, for providing longitudinal support to at least one wedge socket during installation of the shunt joint; and a remote controlled locking means, for locking the actuator motor and the bucker to the frame during installation of the shunt joint.

15. A shunt joint for augmenting an existing joint in a line, comprising:

a first pair of wedges, having an inner surface adapted to engage an output portion of the line at a first location and a tapered outer surface;

a second pair of wedges, having an inner surface adapted to engage an output portion of the line at a second location and a tapered outer surface;

a first wedge socket, having an inner surface for engaging the first pair of wedges to press the first pair of wedges to the line when the first wedge socket is moved longitudinally along the line toward the second pair of wedges;

a second wedge socket, having an inner surface for engaging the second pair of wedges to press the second pair of wedges to the line when the second wedge socket is moved longitudinally along the line toward the first pair of wedges; and means for coupling and pulling the first and second wedge sockets towards one another.

16. The shunt joint of claim 15, wherein the means for coupling and pulling the first and second wedge sockets towards one another comprises:

a threaded shaft; and a first threaded portion, coupled to the first wedge socket and threadably engaging the threaded shaft; and a second threaded portion, coupled to the second wedge socket and threadably engaging the threaded shaft, wherein when the threaded shaft is turned, the first and second wedge sockets are pulled towards one another.

17. The shunt joint of claim 16, wherein said first and second wedge sockets each comprise:

a first wedge socket halve; and a second wedge socket halve, hinged to the first wedge socket halve such that the first and second wedge socket halves may be placed around the line and closed together to surround the line, wherein corresponding pair of wedges lock the first and second wedge socket halves closed.

* * * * *